(12) United States Patent (10) Patent No.: US 8,634,653 B1
Castelaz (45) Date of Patent: Jan. 21, 2014

(54) OBJECT IDENTIFICATION SYSTEM

(75) Inventor: Patrick F. Castelaz, Yorba Linda, CA (US)

(73) Assignee: The Boeing Company, Chicago, IL (US)

( * ) Notice: Subject to any disclaimer, the term of this patent is extended or adjusted under 35 U.S.C. 154(b) by 892 days.

(21) Appl. No.: 12/792,232

(22) Filed: Jun. 2, 2010

(51) Int. Cl.
*G06K 9/48* (2006.01)
*G06K 9/62* (2006.01)
*G06K 9/00* (2006.01)

(52) U.S. Cl.
USPC .......................... 382/197; 382/181; 382/224

(58) Field of Classification Search
None
See application file for complete search history.

(56) References Cited

U.S. PATENT DOCUMENTS

| | | | |
|---|---|---|---|
| 5,040,231 A * | 8/1991 | Terzian | 382/197 |
| 6,243,492 B1 * | 6/2001 | Kamei | 382/181 |
| 6,597,800 B1 * | 7/2003 | Murray et al. | 382/103 |
| 6,944,342 B1 * | 9/2005 | Stahl et al. | 382/224 |

OTHER PUBLICATIONS

Camilleri, "Design Choices and Issues in Fixed-Target B Experiments", European Organization for Nuclear Research, pp. 1-19, 1993.
Mairal et al., "Discriminative Learned Dictionaries for Local Image Analysis", IMA Preprint Series #2212, Jun. 2008, Institute for Mathematics and its Applications, U of Minnesota, pp. 1-8.
Yang et al., "Feature Selection in Face Recognition: A Sparse Representation Perspective", Manuscript submitted to IEEE Trans. PAMI, Aug. 2007, pp. 1-34.
Wright et al., "Robust Face Recognition via Sparse Representation", Manuscript accepted by IEEE Trans. Pami, Mar. 2008, pp. 1-21.
Rodriguez et al., "Sparse Representations for Image Classification: Learning Discriminative and Reconstructive Non-Parametric Dictionaries", IMA Preprint Series #2213, Jun. 2008, Institute for Mathematics and its Applications, U of Minnesota, pp. 1-14.

* cited by examiner

*Primary Examiner* — Vikkram Bali
(74) *Attorney, Agent, or Firm* — Yee & Associates, P.C.

(57) ABSTRACT

A method, apparatus, and computer program product for identifying objects. Pixels for an image of an object are received. A plurality of pixels from the pixels are selected a plurality of times to form groups of sample pixels. Locations in the image for the plurality of pixels in a group of sample pixels are randomly selected for each group in the groups of sample pixels. A vector having a plurality of elements is formed using the groups of sample pixels. Each element in the plurality of elements in the vector corresponds to a group from the groups of sample pixels. The object is identified using the vector.

20 Claims, 9 Drawing Sheets

| HOUGH TRANSFORM | | VECTOR FORMING SYSTEM | |
|---|---|---|---|
| NUMBER OF SEARCH ANGLES PER PIXEL | 150 | PIXELS SELECTED PER REGION = 1 MASK | 20 |
| OPERATIONS PER SEARCH ANGLE | 6 | NUMBER OF MASKS PER REGION | 150 |
| OPERATIONS PER PIXEL | 900 | OPERATIONS PER PIXEL | 0.30 |
| OPERATIONS PER REGION | 9,000,000 | OPERATIONS PER REGION | 3,000 |
| OPERATIONS PER IMAGE | 3,600,000,000 | OPERATIONS PER IMAGE | 1,200,000 |

FIG. 16

OBJECT IDENTIFICATION SYSTEM

BACKGROUND INFORMATION

1. Field

The present disclosure relates generally to identifying objects and, in particular, to a method and apparatus for identifying objects in an image. Still more particularly, the present disclosure relates to a method and apparatus for identifying objects from images generated through responses received from sending signals at objects.

2. Background

Images are often used to identify objects. For example, signals, such as electromagnetic radiation from a radar system, may be directed towards an object. A response is received from these signals. This response may form an image used by a computer system to identify the object. Various attributes in the image may be compared to attributes for known objects.

Processes for identifying objects may be implemented into a computer system to identify objects based on these images. This type of function also may be referred to as automatic target recognition. The data is often obtained from the sensors. These sensors may include, for example, a radar system, an infrared detector, and other suitable types of sensors.

Automatic target recognition is used in various types of platforms. For example, automatic target recognition systems are used in unmanned aerial vehicles and missiles. These types of systems may use a synthetic aperture radar to obtain images of the target. The synthetic aperture radar system may be used in conjunction with an automatic target recognition function to provide information to operate a platform.

With these types of systems, factors, such as cost, power usage, size, weight, speed, and other factors, may be important in selecting a particular type of process or hardware for a computer system.

Accordingly, it would be advantageous to have a method and apparatus that takes into account one or more of the issues discussed above, as well as other possible issues.

SUMMARY

In one illustrative embodiment, a method is provided for identifying objects. Pixels for an image of an object are received. A plurality of pixels from the pixels are selected a plurality of times to form groups of sample pixels. Locations in the image for the plurality of pixels in a group of sample pixels are randomly selected for each group in the groups of sample pixels. A vector having a plurality of elements is formed using the groups of sample pixels. Each element in the plurality of elements in the vector corresponds to a group from the groups of sample pixels. The object is identified using the vector.

In another illustrative embodiment, a method is provided for processing an object. Pieces of data for an object are received. A plurality of pieces of data is randomly selected from the pieces of data a plurality of times to form groups of sample pieces of data. A vector having a plurality of elements is formed using the groups of sample pieces of data. Each element in the plurality of elements in the vector corresponds to a group from the groups of sample pieces of data. The object is identified using the vector.

In yet another illustrative embodiment, an apparatus comprises a receiving system, a selection system, a vector forming system, and an identifying system. The receiving system is configured to receive pixels for an image of an object. The selection system is configured to select a plurality of pixels from the pixels a plurality of times to form groups of sample pixels. Locations for the plurality of pixels in a group are randomly selected in each group in the groups of sample pixels. The vector forming system is configured to form a vector having a plurality of elements using the groups of sample pixels. Each element in the plurality of elements in the vector corresponds to a group from the groups of sample pixels. The identifying system is configured to identify the object using the vector.

In still yet another illustrative embodiment, a computer program product is present for identifying objects. The computer program product comprises a computer recordable storage medium and program code stored on the computer recordable storage medium. Program code is present for receiving pixels for an image of an object. Program code is present for selecting a plurality of pixels from the pixels a plurality of times to form groups of sample pixels. Locations in the image for the plurality of pixels in a group of sample pixels are randomly selected for each group. Program code is present for forming a vector using the groups of sample pixels. Each element in the vector corresponds to a group from the groups of sample pixels. Program code is present for identifying the object using the vector.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof, will best be understood by reference to the following detailed description of an illustrative embodiment of the present disclosure when read in conjunction with the accompanying drawings, wherein:

DETAILED DESCRIPTION

The illustrative embodiments recognize and take into account a number of different considerations. For example, the different illustrative embodiments recognize and take into account that factors, such as speed and accuracy of recognizing objects, are important for many platforms. The different illustrative embodiments recognize and take into account that many processes are currently present for identifying objects.

The different illustrative embodiments recognize and take into account that many of these techniques implement complex algorithms. These algorithms may increase the cost and complexity of object recognition systems. Further, the different illustrative embodiments recognize and take into account that many of these techniques may not provide the desired performance in correctly identifying objects.

These techniques often require increased amounts of power, costs, size, and/or weight for implementation as compared to more simple processes for identifying objects. Additionally, decreasing one or more of these factors often results in a decrease in performance. For example, performance may be reduced by lower processing power and limited space for storing libraries of known objects for use in analysis to identify objects.

Thus, the different illustrative embodiments provide a method and apparatus for identifying objects. In one illustrative embodiment, pixels for an image of an object are received. A plurality of pixels from the pixels is randomly selected a plurality of times to form groups of sample pixels. The locations for the plurality of pixels in a group are randomly selected in each group. A vector is formed using the groups of sample pixels. Each element in the vector includes a group from the groups of sample pixels. The object is then identified using a vector.

Figure 1:
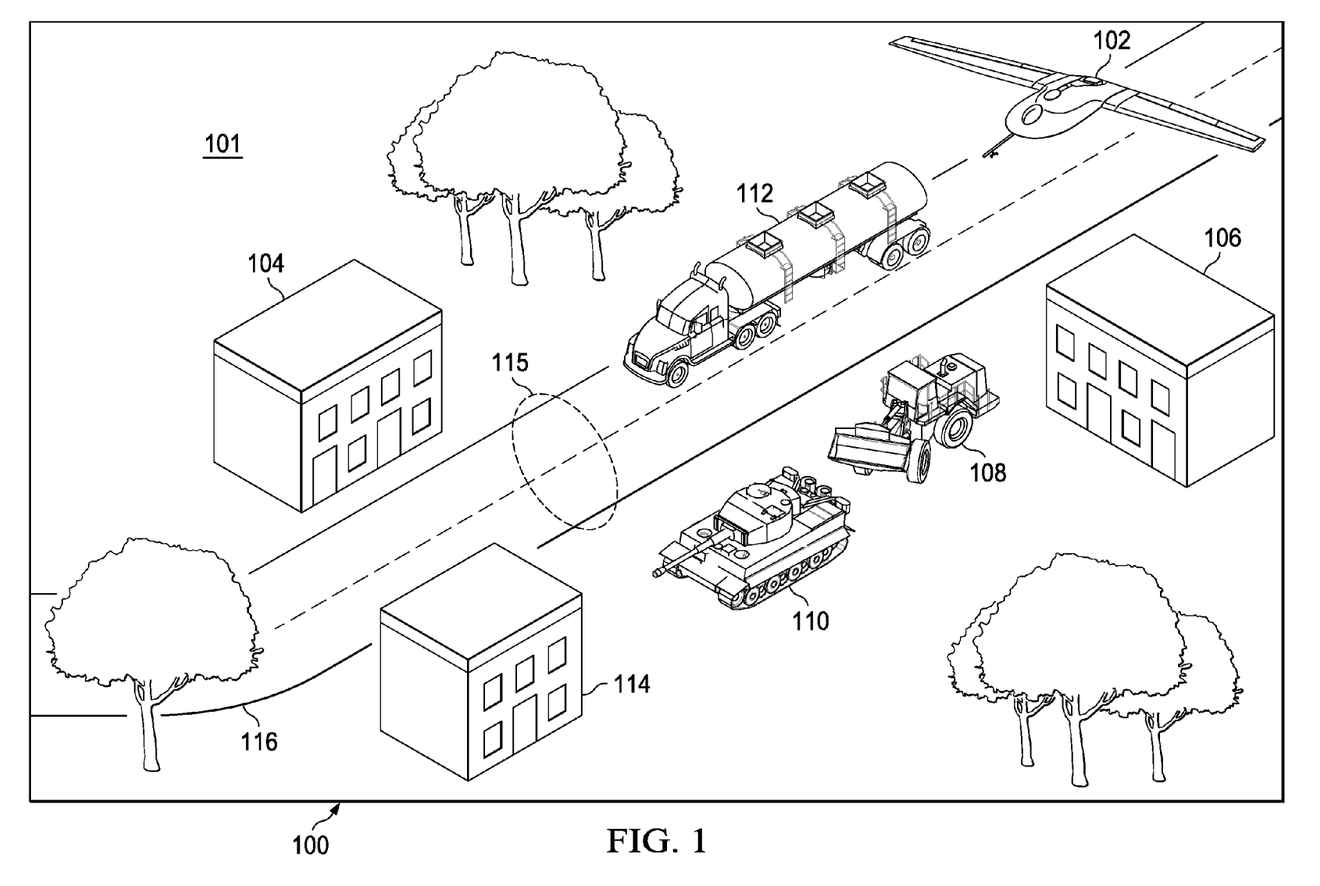
FIG. 1 is an illustration of an environment in accordance with an illustrative embodiment.

With reference now to FIG. 1, an illustration of an environment is depicted in accordance with an illustrative embodiment. In this illustrative example, environment 100 is an example of one environment in which an illustrative embodiment may be implemented.

Environment 100 is city 101 in this example. In other illustrative examples, environment 100 may be a portion of city 101, a geographic region, a neighborhood, or some other suitable environment for which an image may be created.

As depicted, unmanned aerial vehicle 102 flies over city 101. Unmanned aerial vehicle 102 has an imaging system. Unmanned aerial vehicle 102 uses the imaging system to take images of a number of objects in environment 100. These images may be video, photographs, and/or other representations. The number of objects may include, for example, without limitation, building 104, building 106, bulldozer 108, tank 110, truck 112, building 114, portion 115 of road 116, and/or other types of objects.

In these illustrative examples, an object may be identified from the images of the number of objects in environment 100 taken by unmanned aerial vehicle 102. For example, without limitation, tank 110 may be identified from an image taken by unmanned aerial vehicle 102. As one illustrative example, tank 110 may be identified as a target for a missile.

Additionally, unmanned aerial vehicle 102 may follow the movement of tank 110 after identifying tank 110. Unmanned aerial vehicle 102 may transmit the location of tank 110 as tank 110 moves.

The different illustrative embodiments may be applied to other environments, depending on the implementation. For example, the illustrative embodiments may be used by a manned vehicle on the ground, a satellite in outer space, a ship on an ocean, and other suitable platforms in other environments used to identify objects.

Figure 2:
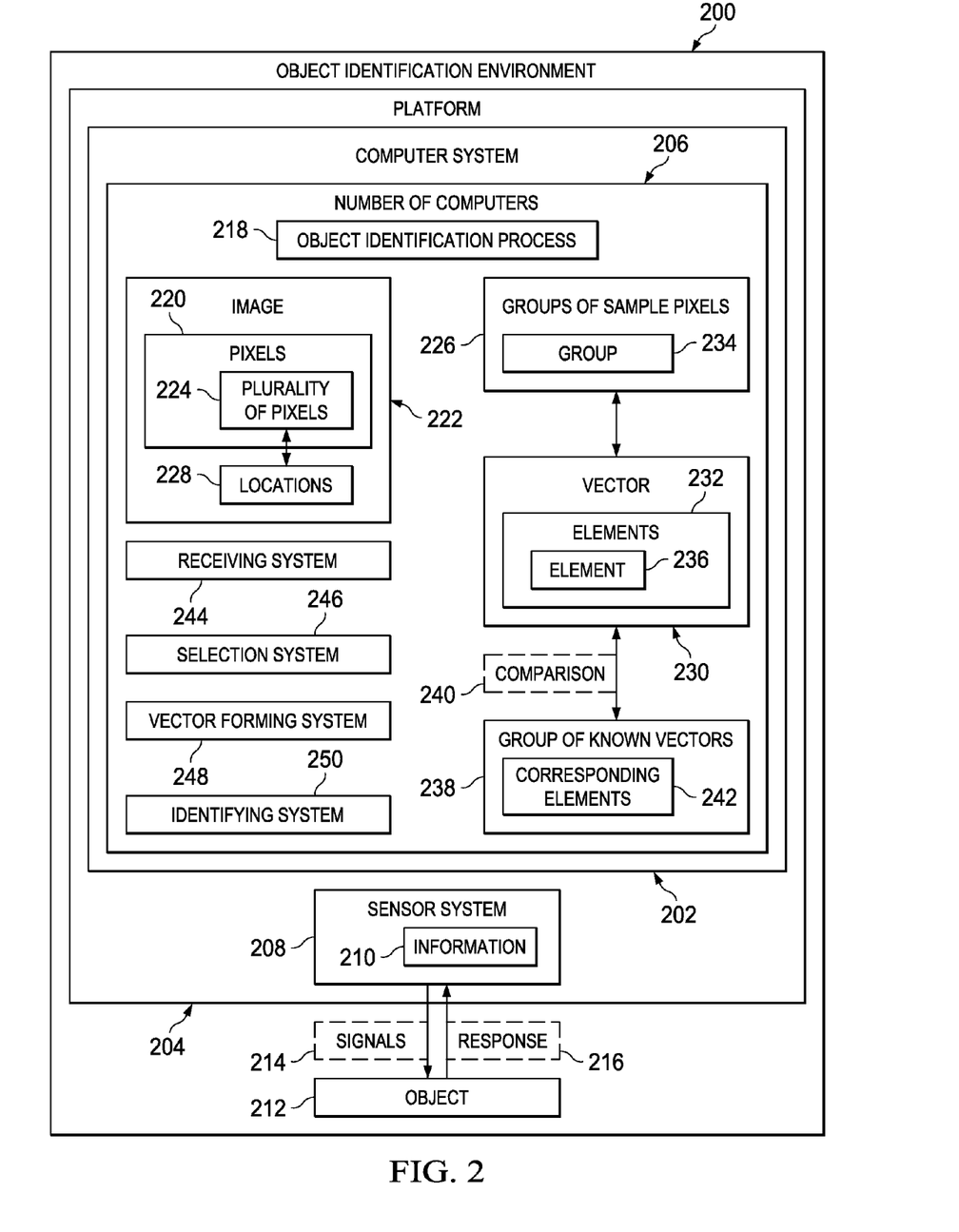
FIG. 2 is an illustration of an object identification environment in accordance with an illustrative embodiment.

With reference now to FIG. 2, an illustration of an object identification environment is depicted in accordance with an illustrative embodiment. In this illustrative example, environment 100 in FIG. 1 is an example of one implementation for object identification environment 200.

As depicted, object identification environment 200 includes computer system 202 associated with platform 204. In these illustrative examples, computer system 202 may be number of computers 206. Number of computers 206 is one or more computers. Number of computers 206 may communicate with each other through a number of different mechanisms, such as wireless connections, a network, or other suitable types of communication systems. Platform 204 may take a number of different forms. For example, platform 204 may be implemented using unmanned aerial vehicle 102 in FIG. 1.

In these illustrative examples, platform 204 also may include sensor system 208. Sensor system 208 may generate information 210 about object 212. Sensor system 208 may include, for example, without limitation, at least one of a radar system, a synthetic aperture radar system, an infrared detector system, or other suitable types of sensor systems.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In these illustrative examples, sensor system 208 may send signals 214 to object 212 and receive response 216. Signals 214 and response 216 may take the form of electromagnetic radiation in these examples. Response 216 is then used to generate information 210 for use by computer system 202 to identify object 212. Information 210 may include at least one of pieces of data, an image, pixels for an image, values for response 216, and other suitable types of information.

Object identification process 218 runs on computer system 202 and processes information 210 to identify object 212 in these illustrative examples. Object identification process 218 takes the form of program code in this illustrative example. In this depicted example, information 210 includes image 222 of object 212. Image 222 includes pixels 220.

Object identification process 218 selects plurality of pixels 224 from pixels 220 a plurality of times. Each plurality of pixels 224 selected forms a group of sample pixels in groups of sample pixels 226. A group, when referring to items, is one or more items. For example, a group of sample pixels is one or more pixels.

In these illustrative examples, object identification process 218 randomly selects locations 228 in image 222 for each plurality of pixels 224. As one specific example, locations 228 in image 222 for each plurality of pixels 224 may be randomly selected such that locations 228 are spread out in image 222.

In other words, locations 228 may be selected such that locations 228 have a distance greater than some selected distance from each other.

Object identification process 218 forms vector 230 using groups of sample pixels 226. Vector 230 contains elements 232. Each element in elements 232 is formed from a group in groups of sample pixels 226. As one illustrative example, sample pixels in group 234 from groups of sample pixels 226 may be summed together to form element 236 in elements 232 for vector 230.

In these illustrative examples, object identification process 218 compares vector 230 to group of known vectors 238 to form comparison 240. Group of known vectors 238 is for a group of known objects. In other words, each known vector in group of known vectors 238 may be a vector formed for a known object.

Further, each known vector in group of known vectors 238 is formed in a manner similar to vector 230. Each known vector in group of known vectors 238 is formed from groups of sample pixels having the same locations as the locations for groups of sample pixels 226. Each element in group of known vectors 238 having the same locations as an element in vector 230 is considered to be a corresponding element to the element having the same locations in vector 230.

Object identification process 218 identifies a difference between elements 232 in vector 230 and corresponding elements 242 in each of group of known vectors 238. Object identification process 218 determines whether the difference between elements 232 in vector 230 and corresponding elements 242 for a known vector in group of known vectors 238 is within a selected threshold.

When the difference is within the selected threshold, object identification process 218 identifies object 212 as the known object for which the known vector was formed. In this manner, object identification process 218 identifies object 212 by comparing vector 230 for object 212 to group of known vectors 238 for known objects. In some illustrative examples, object identification process 218 may identify object 212 as not being one of the known objects.

In these illustrative embodiments, object 212 may take the form of a tank, a bulldozer, a building, a portion of a roadway, a tool, a car, a truck, an aircraft, a signal, a video, a data structure, a file, a loan application, a financial application, a document, a spreadsheet, a database, or some other suitable type of object.

In some illustrative examples, locations 228 for plurality of pixels 224 may be selected ahead of time, for example, before processing of image 222 by object identification process 218. For example, random selections may be made prior to processing. These random selections may be used to form group of known vectors 238. Further, these random selections may then be used to form vector 230.

In some illustrative examples, object identification process 218 may be implemented using hardware. For example, object identification process 218 may be implemented using receiving system 244, selection system 246, vector forming system 248, and identifying system 250. These systems may be comprised of hardware components.

In this illustrative example, receiving system 244 is configured to receive pixels 220 for image 222 of object 212. Selection system 246 is configured to randomly select plurality of pixels 224 from pixels 220 a plurality of times to form groups of sample pixels 226. Vector forming system 248 is configured to form vector 230 using groups of sample pixels 226. Identifying system 250 is configured to identify object 212 using vector 230.

The illustration of object identification environment 200 is not meant to imply physical or architectural limitations to the manner in which different object identification environments may be implemented. For example, other components in addition to or in place of the ones illustrated may be used. Also, in some illustrative embodiments, fewer components than those illustrated for object identification environment 200 may be used.

For example, in some illustrative embodiments, object identification process 218 may be implemented using a combination of both software and hardware components. In other illustrative examples, elements 232 may be formed using other methods other than summing sample pixels. For example, element 236 in elements 232 may be formed by multiplying the sample pixels in group 234 or combining the sample pixels in group 234 in some other suitable manner.

In some illustrative embodiments, identification of object 212 may include identifying characteristics for object 212, identifying whether object 212 meets a number of rules or criteria, or identifying a type for object 212.

In other illustrative embodiments, platform 204 may take the form of a mobile platform, such as, for example, an aircraft, an unmanned aerial vehicle, a helicopter, a submarine, a ship, a ground vehicle, a tank, a satellite, or some others suitable type of platform. In still other illustrative embodiments, platform 204 may take the form of a stationary platform, such as, for example, a building, a portion of a building, a bridge, a space station, a wall, or some other suitable type of stationary platform.

Figure 3:
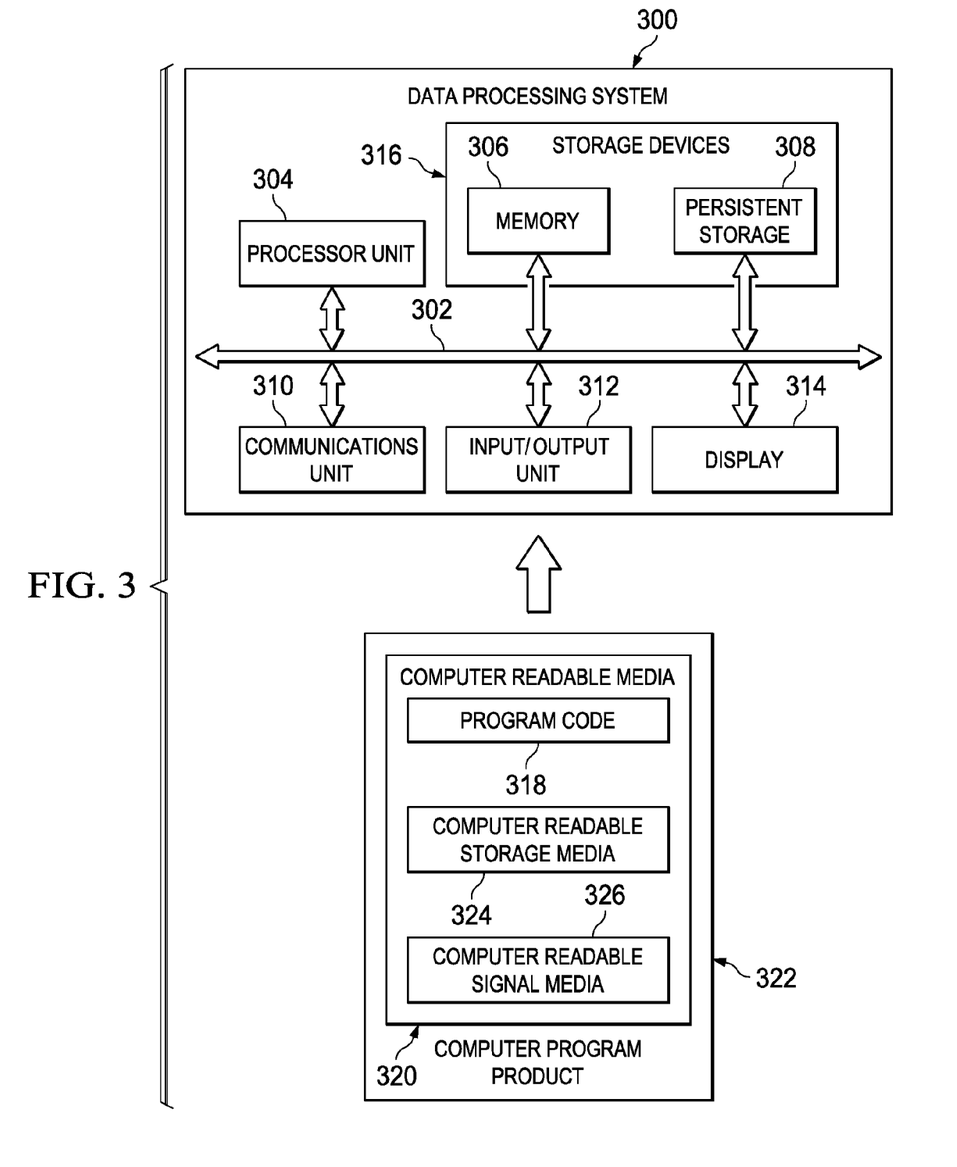
FIG. 3 is an illustration of a data processing system in accordance with an illustrative embodiment.

Turning now to FIG. 3, an illustration of a data processing system is depicted in accordance with an illustrative embodiment. In this illustrative example, data processing system 300 may be used to implement number of computers 206 in FIG. 2. In this example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a number of processors, a multi-processor core, or some other type of processor, depending on the particular implementation. A number, as used herein with reference to an item, means one or more items. Further, processor unit 304 may be implemented using a number of heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device is any piece of hardware that is capable of storing information, such as, for example, without limitation, data, program code in functional form, and/or other suitable information either on a temporary basis and/or a permanent basis. Memory 306, in these examples, may be, for example, a random access memory or any other suitable volatile or non-volatile storage device. Persistent storage 308 may take various forms, depending on the particular implementation.

For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for image inputs from a sensor or user input through a keyboard, a mouse, and/or some other suitable input device. Further, input/output unit 312 may send output to a printer. Display 314 provides a mechanism to display information to a user.

Instructions for the operating system, applications, and/or programs may be located in storage devices 316, which are in communication with processor unit 304 through communications fabric 302. In these illustrative examples, the instructions are in a functional form on persistent storage 308. These instructions may be loaded into memory 306 for execution by processor unit 304. The processes of the different embodiments may be performed by processor unit 304 using computer implemented instructions, which may be located in a memory, such as memory 306.

These instructions are referred to as program code, computer usable program code, or computer readable program code that may be read and executed by a processor in processor unit 304. The program code in the different embodiments may be embodied on different physical or computer readable storage media, such as memory 306 or persistent storage 308.

Program code 318 is located in a functional form on computer readable media 320 that is selectively removable and may be loaded onto or transferred to data processing system 300 for execution by processor unit 304. Program code 318 and computer readable media 320 form computer program product 322 in these examples. In one example, computer readable media 320 may be computer readable storage media 324 or computer readable signal media 326. Computer readable storage media 324 may include, for example, an optical or magnetic disk that is inserted or placed into a drive or other device that is part of persistent storage 308 for transfer onto a storage device, such as a hard drive, that is part of persistent storage 308.

Computer readable storage media 324 also may take the form of a persistent storage, such as a hard drive, a thumb drive, or a flash memory, that is connected to data processing system 300. In some instances, computer readable storage media 324 may not be removable from data processing system 300. In these illustrative examples, computer readable storage media 324 is a non-transitory computer readable storage medium.

Alternatively, program code 318 may be transferred to data processing system 300 using computer readable signal media 326. Computer readable signal media 326 may be, for example, a propagated data signal containing program code 318. For example, computer readable signal media 326 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 318 may be downloaded over a network to persistent storage 308 from another device or data processing system through computer readable signal media 326 for use within data processing system 300. For instance, program code stored in a computer readable storage medium in a server data processing system may be downloaded over a network from the server to data processing system 300. The data processing system providing program code 318 may be a server computer, a client computer, or some other device capable of storing and transmitting program code 318.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 300 is any hardware apparatus that may store data. Memory 306, persistent storage 308, and computer readable media 320 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306, or a cache, such as found in an interface and memory controller hub that may be present in communications fabric 302.

Figure 4:
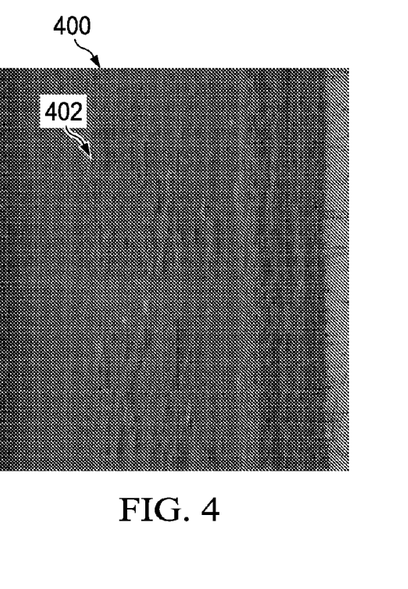
FIG. 4 is an illustration of an image that may be taken using an imaging system in accordance with an illustrative embodiment.

With reference now to FIG. 4, an illustration of an image that may be taken using an imaging system is depicted in accordance with an illustrative embodiment. In this illustrative example, image 400 is an example of image 222 in FIG. 2. Further, image 400 is an example of an image that may be taken using unmanned aerial vehicle 102 in FIG. 1.

As depicted, image 400 is comprised of pixels 402. In this illustrative example, image 400 is taken using a synthetic aperture radar (SAR) system. Further, image 400 may be used in performing automatic target recognition (ATR).

Figure 5:
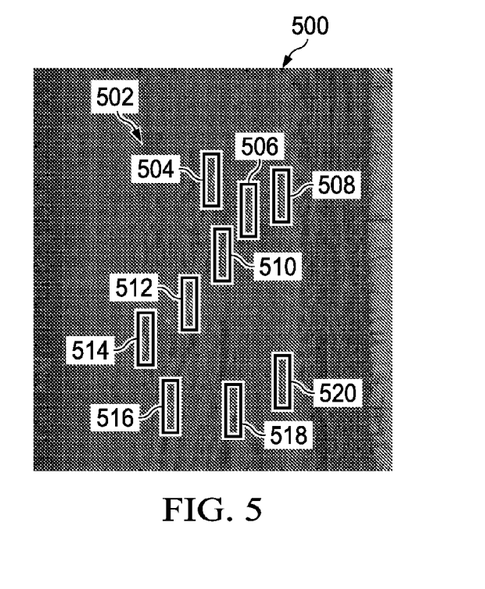
FIG. 5 is an illustration of a selection of regions in an image in accordance with an illustrative embodiment.

With reference now to FIG. 5, an illustration of a selection of regions in an image is depicted in accordance with an illustrative embodiment. In this illustrative example, image 400 from FIG. 4 is enhanced to form enhanced image 500.

In this illustrative example, plurality of regions 502 is selected in enhanced image 500. As depicted, plurality of regions 502 includes regions 504, 506, 508, 510, 512, 514, 516, 518, and 520.

Each of plurality of regions 502 is a region in enhanced image 500 that contains a potential target. In other words, each of plurality of regions 502 contains an object that may be the desired target. Each of these regions may be processed to identify the object in each of the regions. These regions may be processed using, for example, object identification process 218 in FIG. 2.

In this depicted example, plurality of regions 502 may be selected such that the object in a region has a size that is within a selected tolerance of the size of the desired target. For example, the size of each of plurality of regions 502 may be selected such that the region covers at least the diagonal of the size of the desired target plus some selected amount of additional background.

Figure 6:
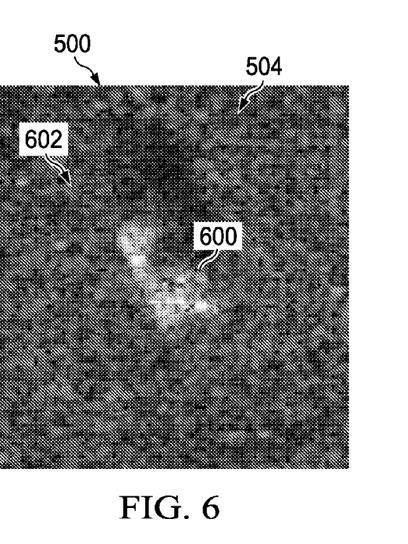
FIG. 6 is an illustration of a magnified view of a region in an image in accordance with an illustrative embodiment.

With reference now to FIG. 6, an illustration of a magnified view of a region in an image is depicted in accordance with an illustrative embodiment. In this illustrative example, a magnified view of region 504 in enhanced image 500 in FIG. 5 is depicted. As depicted in this example, region 504 contains object 600. Object 600 is a potential target. Further, region 504 is comprised of pixels 602.

Figure 7:
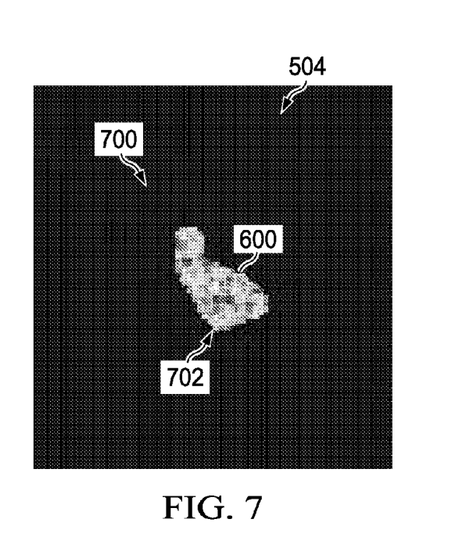
FIG. 7 is an illustration of an enhanced region in an image in accordance with an illustrative embodiment.

With reference now to FIG. 7, an illustration of an enhanced region in an image is depicted in accordance with an illustrative embodiment. In this illustrative example, region 504 in enhanced image 500 in FIGS. 5 and 6 is enhanced to form enhanced region 700. In these depicted examples, enhanced region 700 is used to identify object 600 using object identification process 218 in FIG. 2.

Enhanced region 700 is formed by selecting pixels 702 from pixels 602 in region 504 in FIG. 6 that have an intensity greater than a selected threshold. Pixels 702 having the intensity greater than the selected threshold form object 600.

In some illustrative examples, the selected threshold may be selected by estimating the mean and variance with respect to intensity in the background of enhanced image 500. The background is the part of the image that is not the object. Pixels 702 may then be selected using this selected threshold.

In these illustrative examples, enhanced region 700 is formed to make object 600 easier to identify. In other words, enhanced region 700 is formed to distinguish between pixels that are for object 600 and pixels that are for the background.

Figure 8:
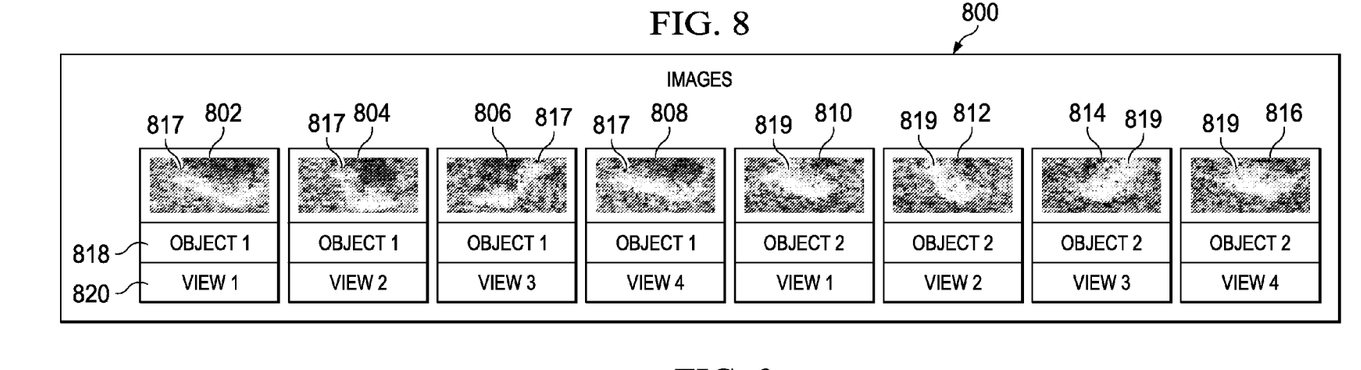
FIG. 8 is an illustration of images of objects in accordance with an illustrative embodiment.

With reference now to FIG. 8, an illustration of images of objects is depicted in accordance with an illustrative embodiment. In this illustrative example, images 800 are images of known objects. Images 800 may be a collection of images stored in a database.

Images 800 include images 802, 804, 806, 808, 810, 812, 814, and 816. Images 802, 804, 806, and 808 contain object 817. Object 817 is a tank in this example. Images 810, 812, 814, and 816 contain object 819. Object 819 is a bulldozer in this example.

As depicted, each of images 800 may be associated with an object identifier and a view identifier. For example, image 802 is associated with object identifier 818 and view identifier 820. Object identifier 818 indicates that object 817 in image 802 is a tank. View identifier 820 indicates that image 802 is taken from a particular type of view and/or at a particular angle.

In this illustrative example, region 504 in FIG. 6 may be compared to images 800 to identify object 600 in region 504. For example, object identification process 218 in FIG. 2 may use images 800 to form known vectors, such as group of known vectors 238 in FIG. 2. These known vectors are compared with a vector formed for region 504. This comparison allows object identification process 218 in FIG. 2 to identify whether object 600 is a known object or not.

Figure 9:
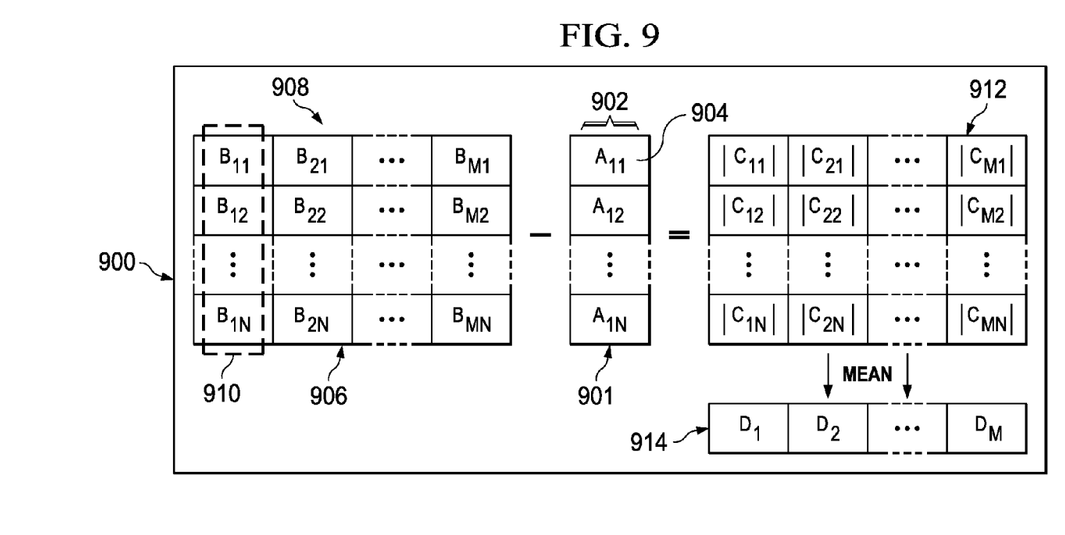
FIG. 9 is an illustration of matrices in an object identification process in accordance with an illustrative embodiment.

With reference now to FIG. 9, an illustration of matrices in an object identification process is depicted in accordance with an illustrative embodiment. In this illustrative example, matrices 900 are used by object identification process 218 in FIG. 2 to identify an object. For example, matrices 900 may be used to identify object 212 in FIG. 2 and/or object 600 in region 504 in FIGS. 6 and 7.

Matrices 900 include matrices and vectors. In this illustrative example, vector 901 is an example of vector 230 in FIG. 2. Further, vector 901 is formed using pixels 702 for object 600 in FIG. 7.

For example, vector 901 contains elements 902. Each of elements 902 corresponds to a group of sample pixels selected from pixels 702 in FIG. 7. For example, element 904 in elements 902 corresponds to a group of sample pixels formed by randomly selecting a plurality of pixels in pixels 702 in FIG. 7. In other words, a plurality of pixels is selected from pixels 702 in locations randomly selected in enhanced region 700 in FIG. 7. The values for the plurality of pixels selected to form the group of sample pixels may be summed together to form element 904.

In this illustrative example, matrix 906 contains group of known vectors 908. Each column in matrix 906 is a known vector in group of known vectors 908. Group of known vectors 908 is formed for known objects.

In this illustrative example, each of group of known vectors 908 in matrix 906 may correspond to an image in images 800 in FIG. 8. For example, known vector 910 in group of known vectors 908 may correspond to image 802 in images 800 in FIG. 8. Each of group of known vectors 908 may be formed in a manner similar to vector 901.

For example, an image in images 800 in FIG. 8 may be enhanced in a manner similar to the manner in which region 504 in FIGS. 5 and 6 is enhanced to form enhanced image 700 in FIG. 7. In other words, in these examples, the enhanced image is formed by selecting pixels in the image that have an intensity greater than a selected threshold.

Each element in each of group of known vectors 908 is formed using a group of sample pixels from the enhanced image. For example, a plurality of pixels is selected from the pixels in the enhanced image to form a group of sample pixels. The values for the group of sample pixels are summed together to form an element in known vector 910 corresponding to an element in vector 901.

The element in known vector 910 corresponds to the element in vector 901 by being in the same row in matrix 906 and vector 901, respectively. The locations of the group of sample pixels used to form the element in known vector 910 are the same as the locations of the group of sample pixels used to form the corresponding element in vector 901.

As depicted, vector 901 is subtracted from matrix 906 to form matrix 912. Elements in each column of matrix 912 may be used to form vector 914. For example, each element in vector 914 is formed by taking the mean of the absolute values of the elements in each corresponding column in matrix 912. In some examples, the mean of the squares of the elements may be taken.

In this illustrative example, each element in vector 914 corresponds to an image in images 800 in FIG. 8. The values of the elements in vector 914 indicate how close object 600 in FIGS. 6 and 7 is to being a known object in images 800. For example, the element having the smallest value indicates that object 600 is closest to being the known object in the corresponding image in images 800.

Further, in some illustrative examples, if the smallest value is not within a selected threshold, object 600 may be identified as being unknown and not one of the known objects in images 800.

Figure 10:
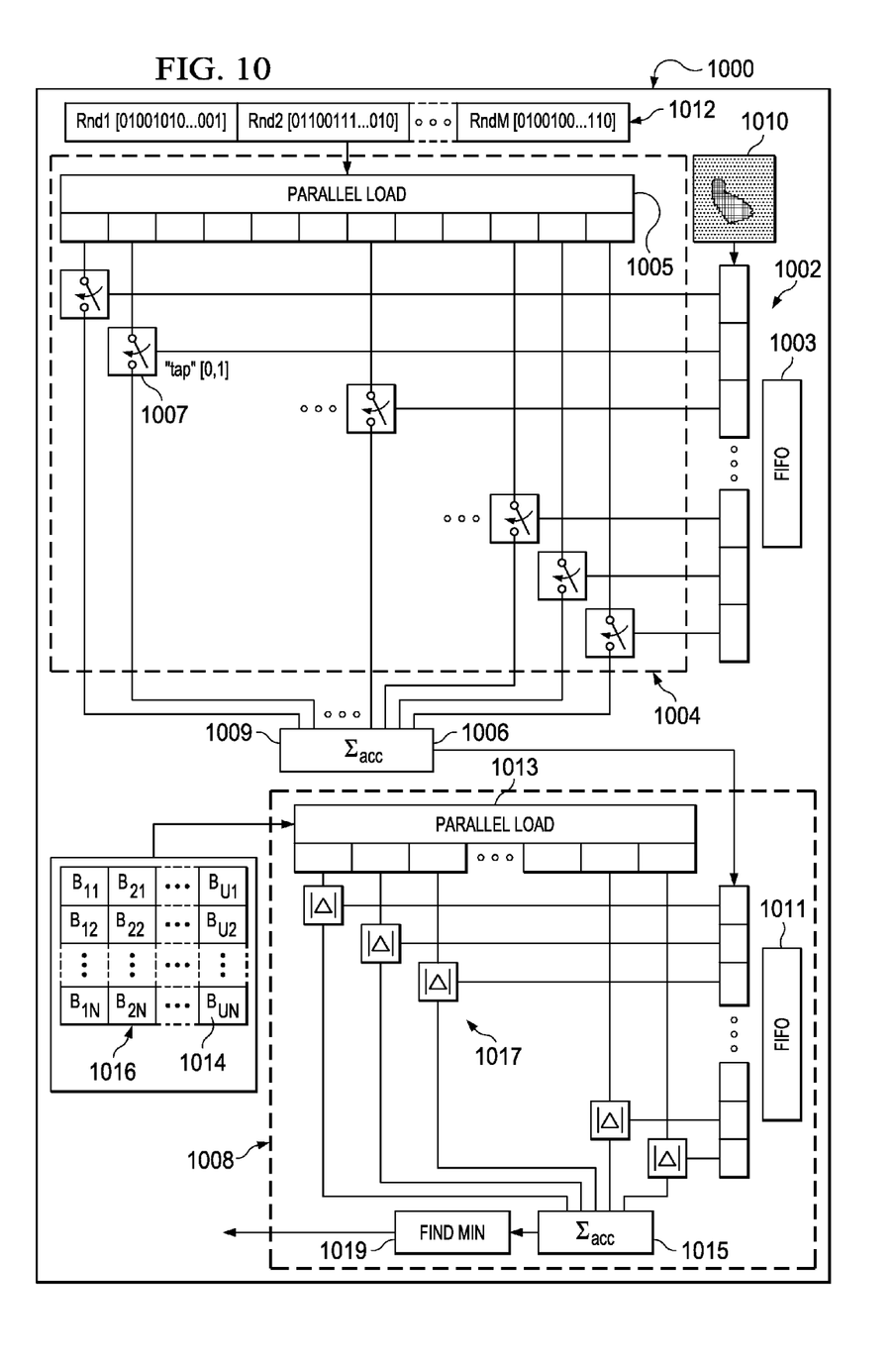
FIG. 10 is an illustration of an object identification process in accordance with an illustrative embodiment.

With reference now to FIG. 10, an illustration of an object identification process is depicted in accordance with an illustrative embodiment. In this illustrative example, object identification hardware 1000 is an example of one implementation for hardware that may be used to implement object identification process 218 in FIG. 2.

Object identification hardware 1000 is comprised of a number of electronic circuits in this depicted example. Further, object identification hardware 1000 is formed using a field programmable gate array (FPGA) in this illustrative example. A field programmable gate array is an integrated circuit that may include a number of transistors, logic blocks, and/or other suitable devices.

In other illustrative examples, object identification hardware 1000 may be formed using a number of different types of hardware. For example, object identification hardware 1000 may be formed using at least one of an application-specific integrated circuit (ASIC), a number of different types of digital chips, and other suitable types of hardware.

Object identification hardware 1000 includes receiving system 1002, selection system 1004, vector forming system 1006, and identifying system 1008. As depicted, receiving system 1002 includes first-in-first-out circuit 1003. Receiving system 1002 receives data for pixels in image 1010. Image 1010 may be, for example, enhanced region 700 comprising pixels 702 in FIG. 7. The data may take the form of a string of values for pixels in image 1010.

Selection system 1004 includes parallel load register 1005 and number of switches 1007. Parallel load register 1005 is configured to receive masks 1012. Masks 1012 are sequences of binary numbers. These sequences are random sequences of binary numbers. Masks 1012 allow selection system 1004 to select which values in the string of values for pixels in image 1010 are used to form elements for a vector, such as vector 230 in FIG. 2 and/or vector 901 in FIG. 9. Each mask in masks 1012 is used to select values for pixels to form an element in the vector.

For example, each of number of switches 1007 is associated with a value in parallel load register 1005 and a value in first-in-first-out circuit 1003. In other words, each of number of switches 1007 is associated with a value in a mask in masks 1012 and a value in the string of values for the pixels of image 1010.

A "1" in masks 1012 indicates that the value at the corresponding location in first-in-first-out circuit 1003 of receiving system 1002 is selected for the element using the associated switch. A "0" in masks 1012 indicates that the value at the corresponding location is not selected for the element using the associated switch.

The values that are selected for the element using a mask in masks 1012 are summed together to form the element in the vector. This summing is performed by vector forming system 1006.

Further, this process for forming an element is repeated for every mask in masks 1012. In this manner, vector forming system 1006 forms each element for the vector one mask at a time. Vector forming system 1006 includes adder block 1009 in this illustrative example. Each element that is formed by vector forming system 1006 is output to identifying system 1008.

Identifying system 1008 includes first-in-first-out circuit 1011, parallel load register 1013, mean value block 1015, number of subtractor blocks 1017, and comparator 1019. First-in-first-out circuit 1011 receives each element that vector forming system 1006 outputs.

Parallel load register 1013 receives group of known vectors 1014 in matrix 1016 as input. Each of group of known vectors 1014 is for a known object. In other words, each of group of known vectors 1014 may be a template for a known object. Group of known vectors 1014 may also be formed using the same masks used by selection system 1004. In other words, group of known vectors 1014 may be formed using masks 1012.

Further, the string of values to which masks 1012 are applied to form group of known vectors 1014 and may have the same order as the string of values received by receiving system 1002 for image 1010.

Each of number of subtractor blocks 1017 is used to calculate the absolute value of the difference between an element in the vector formed by vector forming system 1006 and an element in a known vector in group of known vectors 1014.

In this illustrative example, the values calculated for the absolute values of the differences between each element in the vector formed by vector forming system 1006 and each element in the known vector is averaged using mean value block 1015. In other words, mean value block 1015 identifies the mean values for the absolute values of the differences.

In this manner, a mean value is calculated for each known vector in group of known vectors 1014. The mean values indicate how close the object in image 1010 is to the known objects for group of known vectors 1014.

Identifying system 1008 identifies the minimum value of the mean values using comparator 1019. The minimum value is used to identify the object in image 1010. For example, the object is identified as being the known object for which the known vector in group of known vectors 1014 associated with the minimum value is formed. In some illustrative examples, if the minimum value is not within a selected threshold, the object may be identified as unknown.

In other illustrative examples, object identification hardware 1000 may have a number of selection systems in addition to selection system 1004. For example, object identification hardware 1000 may have a selection system for each mask in masks 1012.

Further, object identification hardware 1000 may have a number of identifying systems in addition to identifying system 1008. The additional identifying systems may be used to process each of group of known vectors 1014 at the same time. In this manner, all of masks 1012 may be processed at the same time, and all of group of known vectors 1014 may be processed at the same time.

Figure 11:
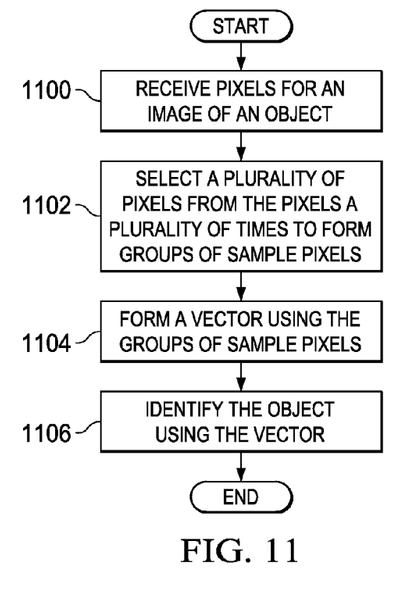
FIG. 11 is an illustration of a flowchart of a process for identifying objects in accordance with an illustrative embodiment.

With reference now to FIG. 11, an illustration of a flowchart of a process for identifying objects is depicted in accordance with an illustrative embodiment. The process illustrated in FIG. 11 may be implemented using object identification process 218 in FIG. 2.

The process begins by receiving pixels for an image of an object (operation 1100). The pixels may be, for example, pixels 220 for image 222 in FIG. 2 and/or pixels 702 for enhanced region 700 in FIG. 7.

The process selects a plurality of pixels from the pixels a plurality of times to form groups of sample pixels (operation 1102). Locations for the plurality of pixels are randomly selected in each group.

Thereafter, a vector is formed using the groups of sample pixels (operation 1104). The vector may be, for example, vector 230 in FIG. 2 and/or vector 901 in FIG. 9. Each element in the vector includes a group from the groups of sample pixels.

The process then identifies the object using the vector (operation 1106), with the process terminating thereafter. In these illustrative examples, the identification may be selected from one of a known object or an unknown object.

Figure 12:
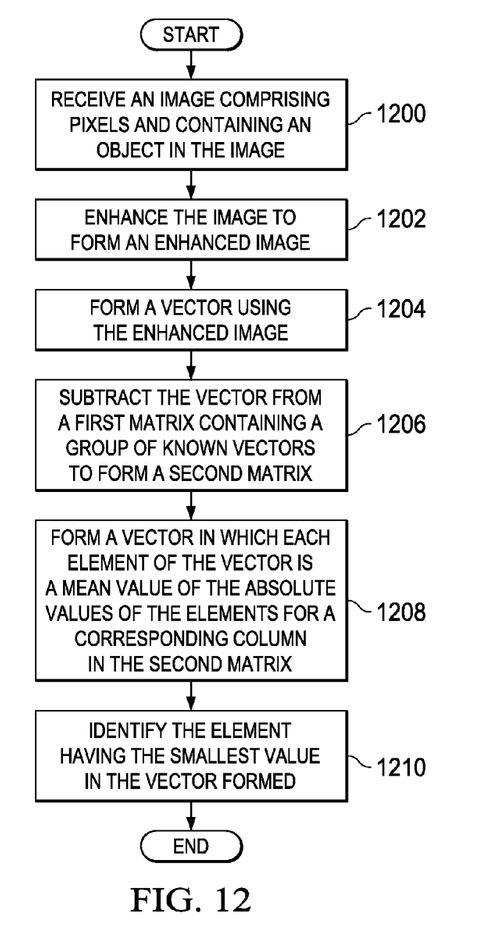
FIG. 12 is an illustration of a flowchart of a process for identifying objects in accordance with an illustrative embodiment.

With reference now to FIG. 12, an illustration of a flowchart of a process for identifying objects is depicted in accordance with an illustrative embodiment. The process illustrated in FIG. 12 may be implemented using object identification process 218 in FIG. 2.

The process begins by receiving an image comprising pixels and containing an object in the image (operation 1200). The image may be, for example, region 504 in FIGS. 5 and 6. The process may then enhance the image to form an enhanced image (operation 1202). The enhanced image may be, for example, enhanced image 700 in FIG. 7. In operation 1202, the image may be enhanced by selecting the pixels that have an intensity greater than a selected threshold to form the enhanced image.

Thereafter, the process forms a vector using the enhanced image (operation 1204). The vector may be, for example vector 230 in FIG. 2 and/or vector 901 in FIG. 9.

The process subtracts the vector from a first matrix containing a group of known vectors to form a second matrix (operation 1206). The first matrix may be, for example, matrix 906 in FIG. 9. The second matrix may be, for example, matrix 912 in FIG. 9. The group of known vectors is for known objects in images.

Thereafter, the process forms a vector in which each element of the vector is a mean value of the absolute values of the elements for a corresponding column in the second matrix (operation 1208). The process then identifies the element having the smallest value in the vector formed (operation 1210), with the process terminating thereafter. In operation 1210, the element having the smallest value indicates the identity of object in the image received. In this manner, the process illustrated in FIG. 12 is used to identify the object in the image.

Figure 13:
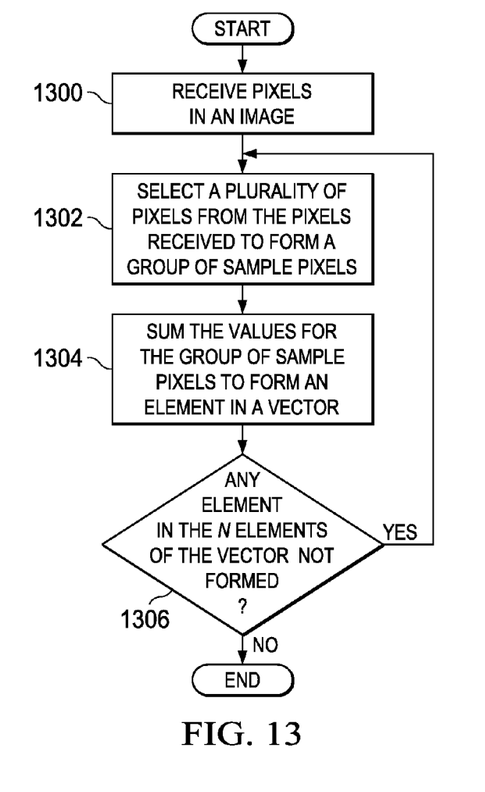
FIG. 13 is an illustration of a flowchart of a process for forming a vector in accordance with an illustrative embodiment.

With reference now to FIG. 13, an illustration of a flowchart of a process for forming a vector is depicted in accordance with an illustrative embodiment. The process illustrated in FIG. 13 is a more-detailed process for performing operation 1204 in FIG. 12. This process may be implemented using object identification process 218 in FIG. 2. Further, the process may be used to form vector 901 in FIG. 9.

The process may begin by receiving pixels in an image (operation 1300). The pixels may be, for example, pixels 702 in enhanced image 700 in FIG. 7. The process may then select a plurality of pixels from the pixels received to form a group of sample pixels (operation 1302). In operation 1302, the plurality of pixels may have locations in the image that are randomly selected.

Thereafter, the process may sum the values for the group of sample pixels to form an element in a vector (operation 1304). The vector may be vector 230 in FIG. 2. The vector may have N elements. The process then determines whether any element in the N elements has not been formed (operation 1306). If elements in the N elements of the vector have not been formed, the process returns to operation 1302 as described above. Otherwise, the process terminates.

In these illustrative examples, the process illustrated in FIG. 13 may also be used to form a known vector for a known object in an image. The locations for the plurality of pixels selected may be the same for the known object and for the unknown object. In other words, the same mask may be used for the known object and for the unknown object. Further, this process may be repeated a number of times for a number of known vectors to form a matrix containing the number of known vectors. The matrix formed may be, for example, matrix 906 in FIG. 9.

Figure 14:
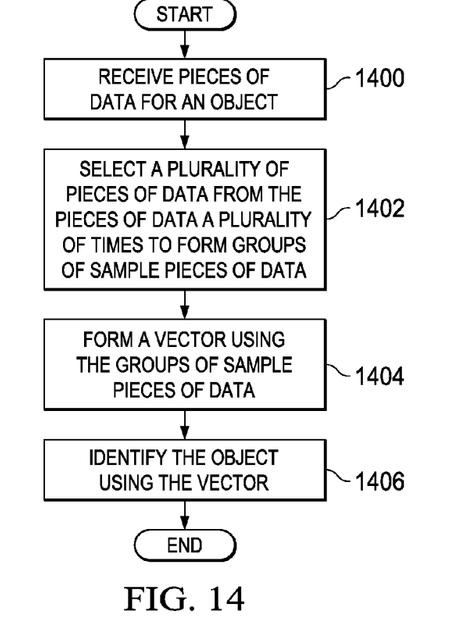
FIG. 14 is an illustration of a flowchart of a process for identifying objects in accordance with an illustrative embodiment.

With reference now to FIG. 14, an illustration of a flowchart of a process for identifying objects is depicted in accordance with an illustrative embodiment. The process illustrated in FIG. 14 may be implemented using object identification process 218 in FIG. 2.

The process begins by receiving pieces of data for an object (operation 1400). The object may be, for example, a data structure, a file, a financial application, a loan application, a job application, a document, or some other suitable type of object.

The process then selects a plurality of pieces of data from the pieces of data a plurality of times to form groups of sample pieces of data (operation 1402). The pieces of data selected to form the groups of sample pieces of data may be randomly selected in operation 1402.

Thereafter, the process forms a vector using the groups of sample pieces of data (operation 1404). Each element in the vector includes a group in the groups of sample pieces of data. The process then identifies the object using the vector (operation 1406), with the process terminating thereafter.

When the object is a financial application, the identification of the object may include identifying whether the application is a desired application or an application that can be approved according to a policy. When the object takes the form of a document, the identification of the object may identify an author of the document from known authors. In yet another example, when the object is a file, the identification of the object may identify whether the file has certain desired characteristics.

Figure 15:
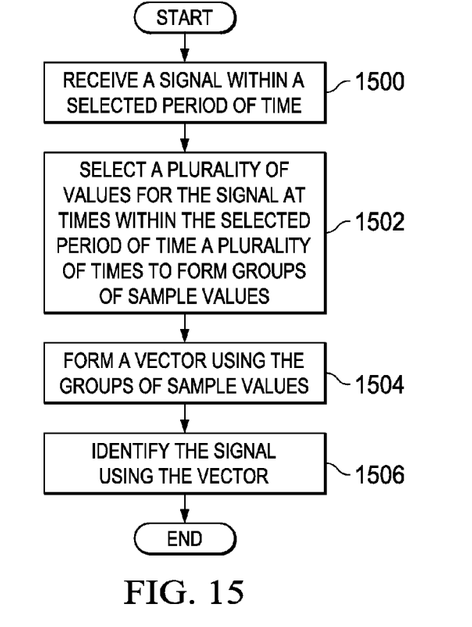
FIG. 15 is an illustration of a flowchart of a process for identifying objects in accordance with an illustrative embodiment.

With reference now to FIG. 15, an illustration of a flowchart of a process for identifying objects is depicted in accordance with an illustrative embodiment. The process illustrated in FIG. 15 may be implemented using object identification process 218 in FIG. 2.

The process begins by receiving a signal within a selected period of time (operation 1500). The process then selects a plurality of values for the signal at times within the selected period of time a plurality of times to form groups of sample values (operation 1502). The values selected to form the groups of sample values are randomly selected in operation 1502.

Thereafter, the process forms a vector using the groups of sample values (operation 1504). Each element in the vector includes a group in the groups of sample values. The process then identifies the signal using the vector (operation 1506), with the process terminating thereafter. In operation 1506, the process identifies the type of signal using the vector. The type of signal is identified by comparing the vector to known vectors for known signals.

The flowcharts and block diagrams in the different depicted embodiments illustrate the architecture, functionality, and operation of some possible implementations of apparatus and methods in different illustrative embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Figure 16:
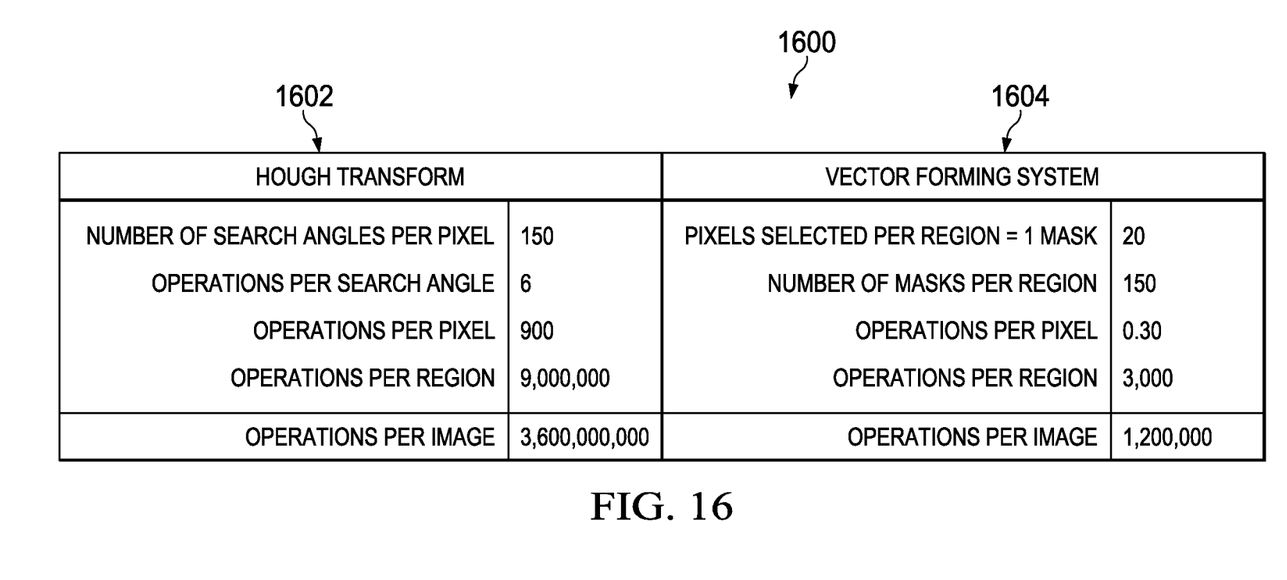
FIG. 16 is an illustration of a table presenting performance data in accordance with an illustrative embodiment.

With reference now to FIG. 16, an illustration of a table presenting performance data is depicted in accordance with an illustrative embodiment. In this illustrative example, table 1600 compares two different methods for extracting features from objects in images to identify the objects. More specifically, table 1600 compares the Hough transform with vector forming system 248 in FIG. 2. The Hough transform is a currently available method for extracting features to identify objects in images.

In this illustrative example, table 1600 compares the number of operations needed to extract features in an image using the object identification process and using the Hough transform. The number of operations may include, for example, a number of summations, a number of multiplications, and/or some other suitable number of operations.

As depicted, table 1600 includes column 1602 for the Hough transform and column 1604 for the vector forming system. In this illustrative example, both methods are used for extracting features from objects in an image having a size of 20,000 pixels by 20,000 pixels. In other words, the image contains 400,000,000 pixels.

With each method, a plurality of regions is selected in the image. Each region in the plurality of regions has a size of 100 pixels by 100 pixels. In other words, each region contains 10,000 pixels. In this illustrative example, 400 regions are selected in a single image.

As indicated in column 1602, with the Hough transform, about 3,600,000,000 operations are needed to process the 400 regions selected in a single image. In other words, with the Hough transform, about 9,000,000 operations are needed to extract features to identify the objects in a single image.

However, with the vector forming system, about 1,200,000 operations are needed to process the 400 regions selected in a single image. About 3,000 times more operations are needed for the Hough transform as compared to the vector forming system.

Thus, the vector forming system is about 3,000 times more efficient in processing the regions selected in an image as compared to the Hough transform. In other words, less processing power, fewer resources, and fewer costs are associated with using the vector forming system as compared to the Hough transform.

The different illustrative embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for identifying objects, the method comprising:
   receiving pixels for an image of an object;
   selecting a plurality of pixels from the pixels a plurality of times to form groups of sample pixels, wherein locations in the image for the plurality of pixels in a group of sample pixels are randomly selected for each group in the groups of sample pixels;
   forming a vector having a plurality of elements using the groups of sample pixels, wherein each element in the plurality of elements in the vector corresponds to a group from the groups of sample pixels; and
   identifying the object using the vector.

2. The method of claim 1 further comprising:
   sending signals to the object;
   receiving a response from sending the signals to the object; and
   generating the image using the response, wherein the image includes the pixels.

3. The method of claim 1, wherein the step of forming the vector having the plurality of elements using the groups of sample pixels comprises:
   summing the plurality of pixels in the each group from the groups of sample pixels to form the each element in the plurality of elements.

4. The method of claim 1, wherein the step of identifying the object using the vector comprises:
   comparing the vector to a group of known vectors to form a comparison; and
   identifying the object using the comparison.

5. The method of claim 4, wherein the step of comparing the vector to the group of known vectors to form the comparison comprises:
   identifying a difference between corresponding elements in the vector and in the group of known vectors.

6. The method of claim 5, wherein the difference is an absolute difference and wherein the identifying step comprises:
    identifying the object as a known object for a known vector in the group of known vectors when the absolute difference between the corresponding elements in the vector and in the group of known vectors are within a selected threshold.

7. The method of claim 4, wherein the image is a first image, the pixels are first pixels, the plurality of pixels are a first plurality of pixels, and the groups of sample pixels are first groups of sample pixels and further comprising:
    selecting a second plurality of pixels from second pixels for a second image the plurality of times to form second groups of sample pixels, wherein locations in the second image for the second plurality of pixels in each group in the second groups of sample pixels correspond to locations in the first image for the first plurality of pixels in a corresponding group in the first groups of sample pixels; and
    forming a known vector in the group of known vectors using the second groups of sample pixels.

8. A method for processing an object, the method comprising:
    receiving pieces of data for the object;
    randomly selecting a plurality of pieces of data from the pieces of data a plurality of times to form groups of sample pieces of data;
    forming a vector having a plurality of elements using the groups of sample pieces of data, wherein each element in the plurality of elements in the vector corresponds to a group from the groups of sample pieces of data; and
    identifying the object using the vector.

9. The method of claim 8, wherein the pieces of data are selected from one of pixels for an image of the object, values for a signal, and information in a data structure or file.

10. An apparatus comprising:
    a receiving system, comprising one or more of a plurality of hardware components, configured to receive pixels for an image of an object;
    a selection system, comprising one or more of the plurality of hardware components, configured to select a plurality of pixels from the pixels a plurality of times to form groups of sample pixels, wherein locations for the plurality of pixels in a group are randomly selected in each group in the groups of sample pixels;
    a vector forming system, comprising one or more of the plurality of hardware components, configured to form a vector having a plurality of elements using the groups of sample pixels, wherein each element in the plurality of elements in the vector corresponds to the group from the groups of sample pixels; and
    an identifying system, comprising one or more of the plurality of hardware components, configured to identify the object using the vector.

11. The apparatus of claim 10, wherein the receiving system, the selection system, the vector forming system, and the identifying system comprise program code running on a computer system.

12. The apparatus of claim 10, wherein the receiving system, the selection system, the vector forming system, and the identifying system comprise a number of electronic circuits.

13. The apparatus of claim 12, wherein the number of electronic circuits are on at least one of a field programmable gate array, an application-specific integrated circuit, and a digital chip.

14. The apparatus of claim 10, wherein the vector forming system is further configured to sum the plurality of pixels in the each group in the groups of sample pixels to form the each element in the plurality of elements.

15. The apparatus of claim 10, wherein in being configured to identify the object using the vector, the identifying system is configured to compare the vector to a group of known vectors to form a comparison and to identify the object using the comparison.

16. The apparatus of claim 15, wherein in being configured to compare the vector to the group of known vectors, the identifying system is configured to identify a difference between corresponding elements in the vector and in the group of known vectors.

17. The apparatus of claim 16, wherein the identifying system is configured to identify the object as a known object for a known vector in the group of known vectors when the difference between the corresponding elements in the vector and in the known vector is within a selected threshold.

18. A non-transitory computer readable storage medium storing program code which, when executed by a processor, performs a method on one or more hardware components, the program code comprising:
    program code configured to receive pixels for an image of an object;
    program code configured to select a plurality of pixels from the pixels a plurality of times to form groups of sample pixels, wherein locations in the image for the plurality of pixels in a group of sample pixels are randomly selected for each group;
    program code configured to form a vector using the groups of sample pixels, wherein each element in the vector corresponds to a group from the groups of sample pixels; and
    program code configured to identify the object using the vector.

19. The non-transitory computer readable storage medium of claim 18, wherein the program code configured to identify the object using the vector comprises:
    program code configured to compare the vector to a group of known vectors to form a comparison; and
    program code configured to identify the object using the comparison.

20. The non-transitory computer readable storage medium of claim 19, wherein the program code configured to compare the vector to the group of known vectors to form the comparison comprises:
    program code configured to identify a difference between corresponding elements in the vector and in the group of known vectors.

* * * * *